US011052450B2

(12) United States Patent
Ye et al.

(10) Patent No.: US 11,052,450 B2
(45) Date of Patent: Jul. 6, 2021

(54) SPRING FORMING MACHINE HAVING TOOL ROTATION AND TOOL RETRACTION CAPABILITIES

(71) Applicant: HUIZHOU ODMAY MACHINERY CO., LTD., Huizhou (CN)

(72) Inventors: Song-Wei Ye, Huizhou (CN); Xiao-Hong Zhou, Huizhou (CN); Jian-Ming Long, Huizhou (CN)

(73) Assignee: HUIZHOU ODMAY MACHINERY CO., LTD., Huizhou (CN)

( * ) Notice: Subject to any disclaimer, the term of this patent is extended or adjusted under 35 U.S.C. 154(b) by 99 days.

(21) Appl. No.: 16/600,550

(22) Filed: Oct. 13, 2019

(65) Prior Publication Data
US 2020/0316671 A1    Oct. 8, 2020

(30) Foreign Application Priority Data

Apr. 2, 2019  (TW) ................................. 108204064
Jun. 26, 2019 (TW) ................................. 108208189

(51) Int. Cl.
*B21F 35/00* (2006.01)

(52) U.S. Cl.
CPC .......... *B21F 35/00* (2013.01); *F16F 2226/04* (2013.01)

(58) Field of Classification Search
CPC .. B21F 35/00; B21F 3/02; B21F 1/006; B21F 3/00; B21F 37/02; F16F 2226/04
See application file for complete search history.

(56) References Cited

U.S. PATENT DOCUMENTS

| 5,182,930 | A * | 2/1993 | Matsuoka | ................. | B21F 3/02 |
| | | | | | 72/138 |
| 5,269,165 | A * | 12/1993 | Matsuoka | ................. | B21F 3/10 |
| | | | | | 72/138 |
| 10,384,260 | B2 * | 8/2019 | Yang | ......................... | B21F 3/02 |
| 10,507,513 | B2 * | 12/2019 | Yang | ......................... | B21F 3/02 |
| 10,618,098 | B2 * | 4/2020 | Yang | ......................... | B21F 3/06 |
| 2017/0182545 | A1 * | 6/2017 | Yang | ......................... | B21F 3/02 |
| 2018/0085818 | A1 * | 3/2018 | Yang | ....................... | B21F 35/00 |
| 2018/0085819 | A1 * | 3/2018 | Yang | ......................... | B21F 3/02 |

* cited by examiner

*Primary Examiner* — Lawrence Averick
(74) *Attorney, Agent, or Firm* — Chun-Ming Shih; HDLS IPR Services (57) ABSTRACT

A spring forming machine having tool rotation and tool retraction capabilities, that includes: a rotary beak seat mechanism and a dual-transmission core rotation separation mechanism. The rotary beak seat mechanism is installed on a transmission mechanism of an outside machine panel board through a panel board bearing. The rotary beak seat mechanism includes a rotation component, that rotates 360 degrees around a central axis of the panel board bearing. On a front end of the rotation component is disposed a slide seat component coaxially. The dual-transmission core rotation separation mechanism includes: a first substrate, in a center of a front plate surface of the first substrate is disposed the rotary beak seat mechanism, on a back plate surface of the first substrate is disposed an axle core positioning mechanism, an inner circle core rotation transmission mechanism, and an outer circle tool rotation transmission mechanism.

8 Claims, 10 Drawing Sheets

SPRING FORMING MACHINE HAVING TOOL ROTATION AND TOOL RETRACTION CAPABILITIES

BACKGROUND OF THE INVENTION

Field of the Invention

The preferred embodiment of the present invention relates to a spring forming machine used for manufacturing spring, and in particular to a spring forming machine having tool rotation and tool retraction capabilities, that is capable of realizing smooth tool rotation and tool retraction, reducing the time caused by multi-processing or reworks of the spring, and eliminating jamming and failure of tool retraction.

The Prior Arts

In producing springs, the conventional spring forming machine has the following shortcomings:

1. When the tool rotates 360 degrees around the axle core, the tool must rotate synchronously together with the axle core (unitary transmission). The tool is not able to rotate independently, thus it can only bend, twist the wire along the direction of the axle core. As such, it lacks flexibility, and is liable to being jammed. Therefore, in the spring forming process, the processing blind angle may occur quite often, and that leads to processing difficulties. In this process, secondary processing and rework are often required to produce spring of desired gauge, as such its yield and production efficiency are rather low.

2. In bending angle for short size springs, it often encounters the technical difficulties, such as tool not being able to be retracted, jamming of tools, or not being able to pull back the tool.

Therefore, presently, the design and performance of the spring forming machine is not quite satisfactory, and it leaves much room for improvement.

SUMMARY OF THE INVENTION

In view of the problems and drawbacks of the prior art, the preferred embodiment of the present invention provides a spring forming machine having tool rotation and tool retraction capabilities, to overcome the shortcomings of the Prior Art.

The objective of the present invention is to provide a spring forming machine having tool rotation and tool retraction capabilities, that is capable of realizing smooth tool rotation and tool retraction, reducing the time caused by multi-processing or reworks of the spring, and eliminating jamming and failure of tool retraction. In this way, the present invention is able to solve the technical difficulties of the Prior Art, such as tool not being able to be retracted, jamming of the tools, or not being able to pull back the tool.

In order to achieve the objective mentioned above, the technical characteristics of the present invention is that, through the inner circle core rotation transmission mechanism and the outer circle tool rotation transmission mechanism disposed in the rear part of the rotary beak seat mechanism, the two round discs on the rotary beak seat mechanism can be rotated 360 degrees around independently. As such, the core rotation bridge gear on the inner circle core rotation transmission mechanism brings the core rotation gear of the rotary beak seat mechanism into rotation. Further, the outer circle tool rotation transmission gear of the outer circle tool rotation transmission mechanism brings the outer circle tool rotation gear of the rotary beak seat mechanism into rotation, so that the inner circle core rotation transmission mechanism brings the axle core into rotation. In this approach, the present invention is able to achieve the objective of producing springs of the desired gauge, and has the advantages of increased processing flexibility without any blind angle, and without the need of secondary processing or rework, in realizing saving of repeated processings significantly.

In addition, the present invention utilizes the swing component and the tool component on the slide seat component of the rotary beak seat mechanism, to make the tool retraction hook to perform lever-like turning and flipping movements. Therefore, when the tool retraction hook swings downward, the swing component is brought to turn and flip upward, to bring the tool component to move upward to achieve tool retraction, in realizing a fast and smooth tool retraction. In contrast, when the tool retraction hook swings upward, the swing component is brought to turn and flip downward, to bring the tool component to move downward to realize inward clipping of the tool. Therefore, the present invention solves the problem of the Prior Art that, tool can not be pulled back or tool retraction can not be done smoothly.

Further scope of the applicability of the present invention and embodiments thereof will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from this detailed descriptions.

BRIEF DESCRIPTION OF THE DRAWINGS

Embodiments of the present invention are described below, by way of example only, with reference to the accompanying drawings in which.

DETAILED DESCRIPTION OF THE PREFERRED EMBODIMENT

The purpose, construction, features, functions and advantages of the present invention and its embodiments can be appreciated and understood more thoroughly through the following detailed descriptions with reference to the attached drawings.

Figure 1:
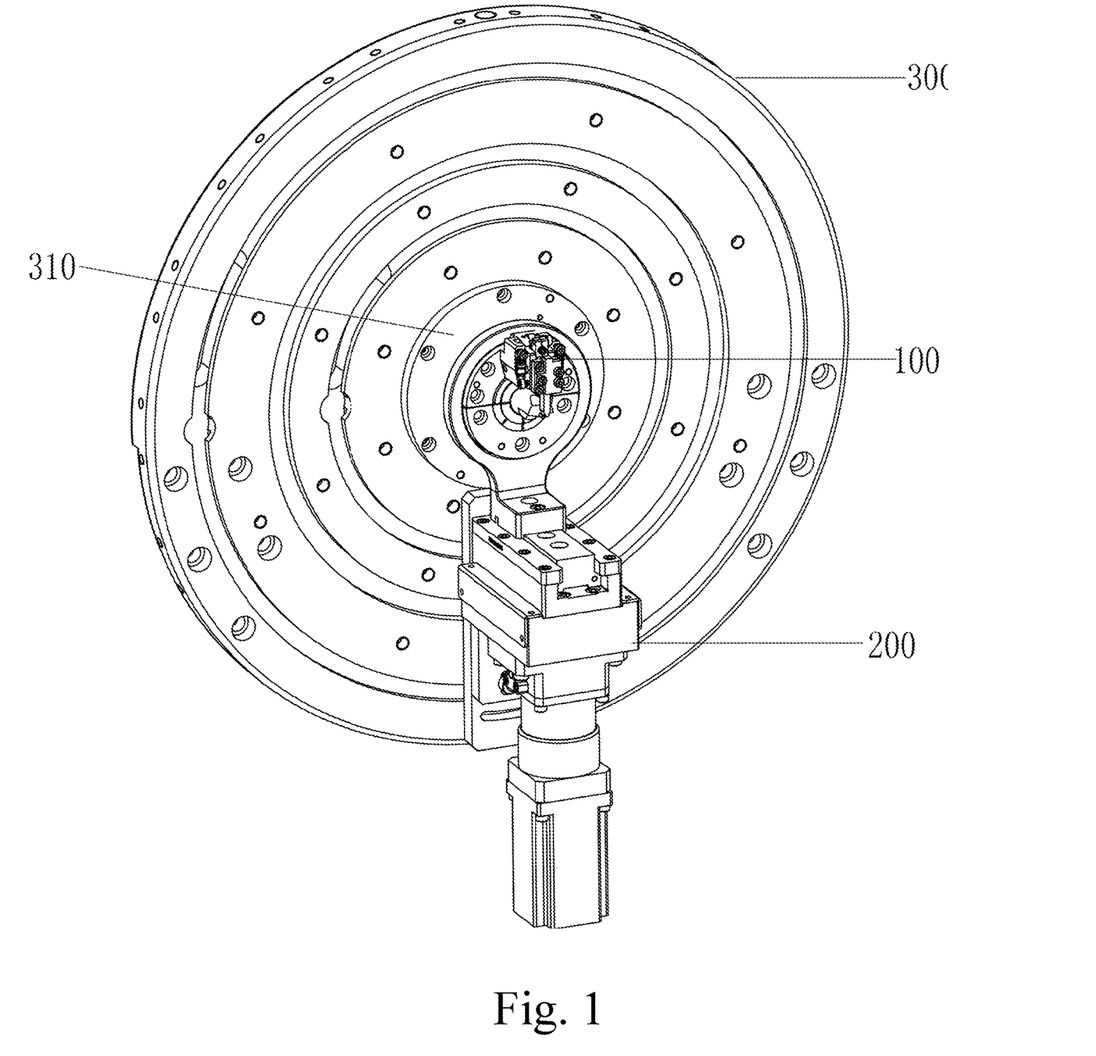
FIG. 1 is a schematic diagram showing the disposition of installing a rotary beak seat mechanism to an outside machine according to an embodiment of the present invention.
Figure 2:
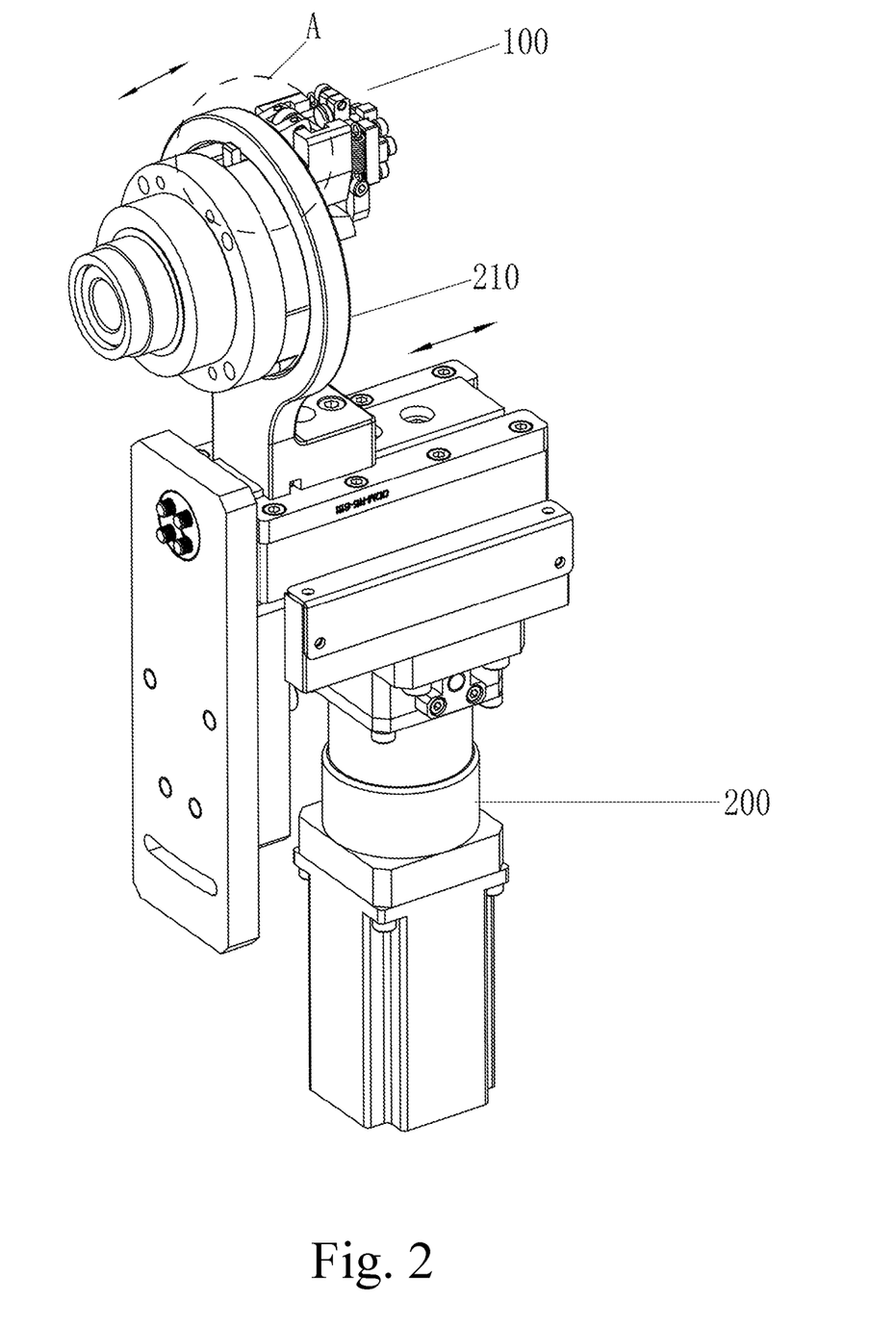
FIG. 2 is a schematic diagram showing the disposition of installing a rotary beak seat mechanism to an outside machine as viewed from another angle in a backside of a panel board.
Figure 3:
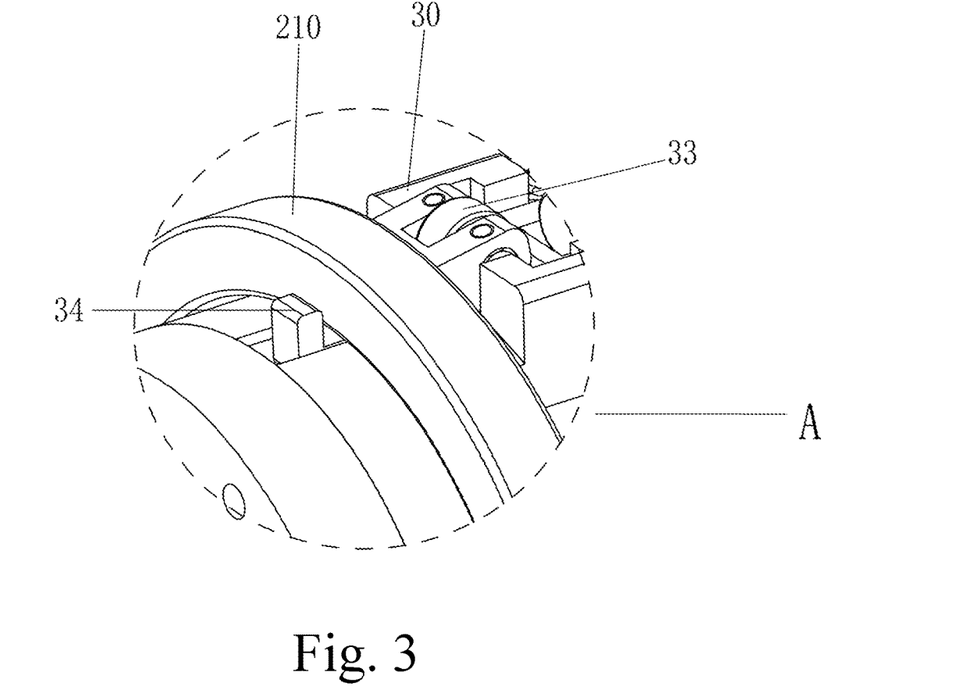
FIG. 3 is an enlarged view of the portion A as shown in FIG. 2.

Refer to FIGS. 1 to 3 respectively for a schematic diagram showing the disposition of installing a rotary beak seat mechanism to an outside machine according to an embodiment of the present invention; a schematic diagram showing the disposition of installing a beak seat mechanism to an outside machine as viewed from another angle in a backside of a panel board; and an enlarged view of the portion A as shown in FIG. 2.

As shown in FIGS. 1 to 3, the spring forming machine having tool rotation and tool retraction capabilities includes: a rotary beak seat mechanism 100, and a dual-transmission core rotation separation mechanism. Wherein, the rotary beak seat mechanism 100 can be installed on a panel board 300 of an outside machine through a panel board bearing 310, on the panel board 300 is disposed a transmission mechanism 200; and on the transmission mechanism 200 is disposed a round push rod 210, sleeved around outside of the rotary beak seat mechanism 100.

Figure 4:
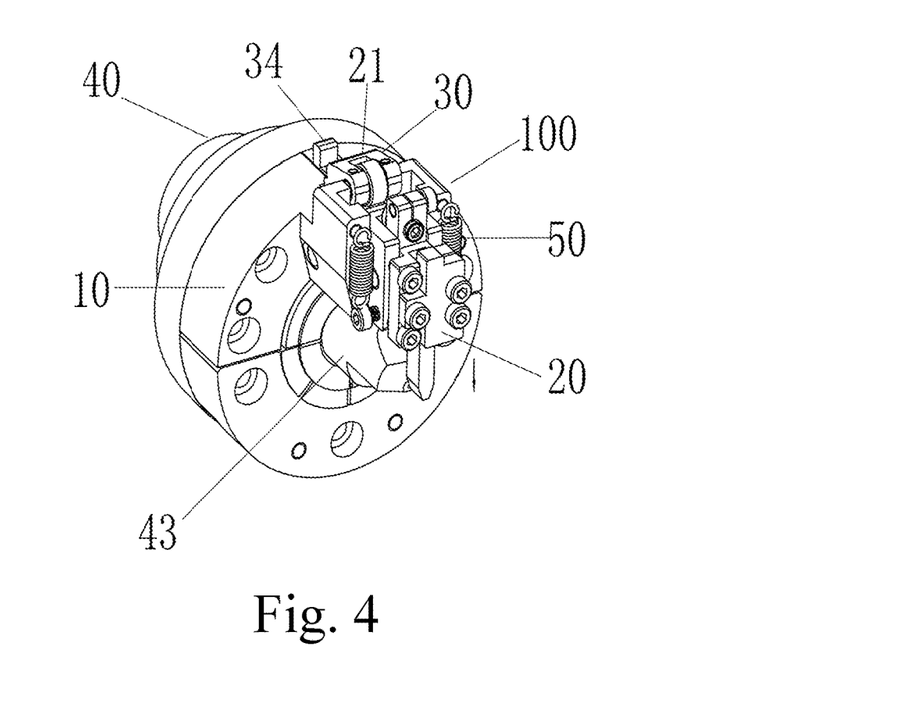
FIG. 4 is a perspective view of a rotary beak seat mechanism according an embodiment of the present invention.
Figure 5:
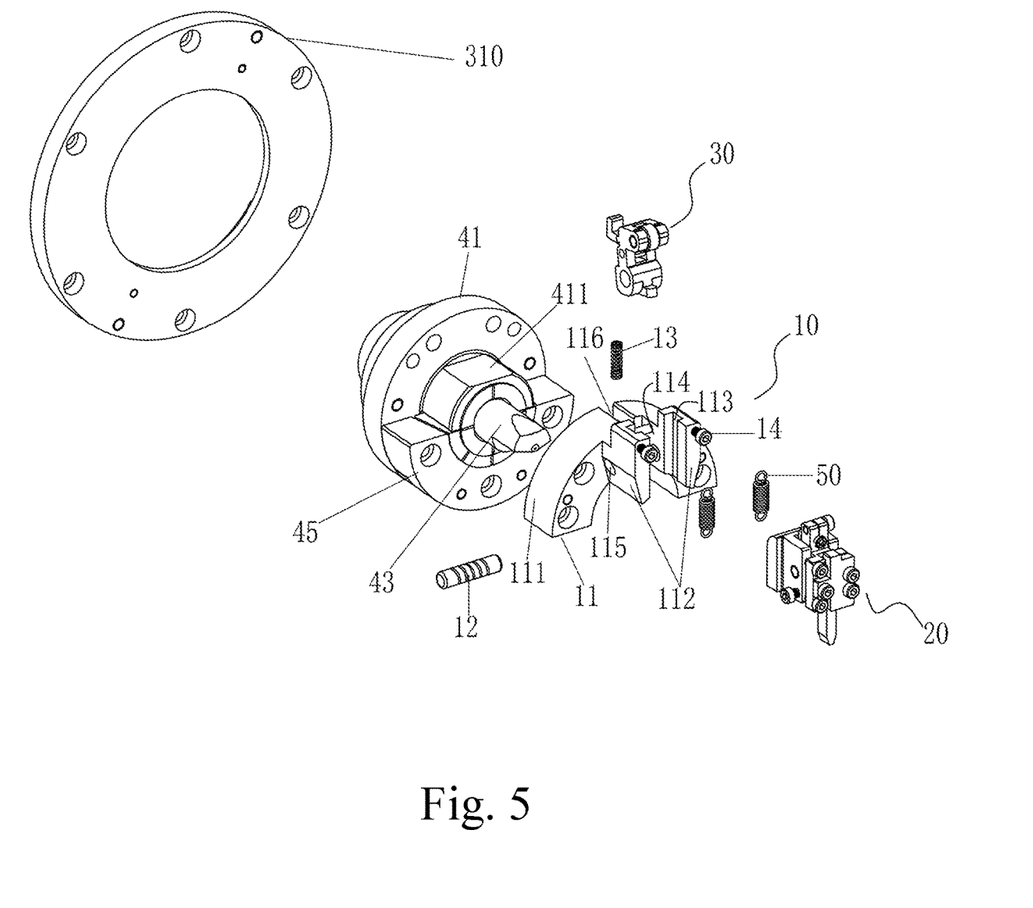
FIG. 5 is an exploded view of a rotary beak seat mechanism as shown in FIG. 4.

Further, as shown in FIGS. 3 to 5, the rotary beak seat mechanism 100 includes a rotation component 40, that is able to rotate 360 degrees around a central axial line of the panel board bearing 310. On a front end of the rotation component 40 is disposed and fixed a slide seat component 10 coaxially. On the slide seat component 10 is disposed a tool component 20 and a swing component 30. The swing component 30 and the slide component 10 are connected to each other, and both rotate around the same axis. The tool component 20 is able to move reciprocally along a vertical direction of the slide seat component 10. A slide block spring 50 is connected vertically between the tool component 20 and slide seat component 10.

On the swing component 30 is connected rotatably to a tool retraction hook 34 being able to perform lever-like turning and flipping movement. The tilt end of the tool retraction hook 34 is clipped by the inner wall of the round-shape push rod 210, to restrict the outward flipping angle of the tool retraction hook 34. When the tool retraction hook 34 swings away from the inner wall of the round-shape push rod 210, it brings the swing component 30 to turn and flip upward, that in turn brings the tool component 20 to move upward, to realize tool retraction.

The slide seat component 10 includes further a fixing slide seat 11, a swing axle 12, a hook spring 13, and a first lead screw 14. The fixing slide seat 11 includes a semi-circular bottom plate 111. On the plate surface of one side of a semi-circular bottom plate 111 is disposed two first support arms 112 parallel and opposite to each other. A first slide slot 113 and a second slide slot 114 are disposed between the two first support arms 112, and is indent relative to the plate surface of the semi-circular bottom plate 111, Two ends of the first slide slot 113 and the second slide slot 114 are disposed leading to outside. On the two opposite sidewalls of the two first support arms 112 are formed respectively a swing axle installation hole 115, to allow the first lead screw 14 to connect and fix along a central axial line of the semi-circular bottom plate 111. One end of the slide block spring 50 is sleeved around the first lead screw 14. A hook slot 116 is disposed on the outer wall of the semi-circular bottom plate 111 facing the second slide slot 114. The hook spring 16 can be pressed into the hook slot 166 and deformed.

The swing component 30 includes: a swing seat 31, a bearing axle 32, a roller 33, a tool retraction axle 341, and a tool retraction hook 34. The roller 33 can be sleeved around the outer wall of the bearing axle 32 coaxially, and the tool retraction hook 34 can be sleeved around the outer wall of the tool retraction axle 341 coaxially. The bearing axle 32 and the tool retraction axle 341 are connected pivotally to the swing seat 31

Figure 6:
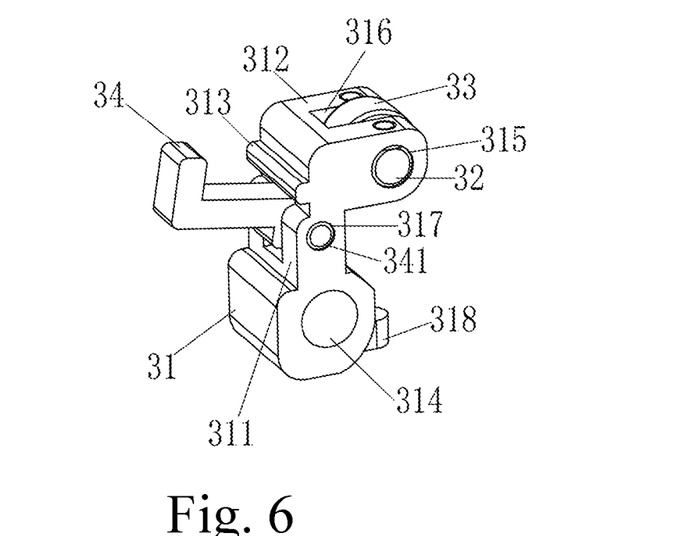
FIG. 6 is a perspective view of a swing component as shown in FIG. 5.

As shown in FIGS. 5 and 6, the swing seat 31 is of an L shape, and it includes a first plate 311 and a second plate 312 vertical to each other and formed into a body. The first plate 311 can be inserted into a second slide slot 114 of the fixing slide seat 11. On the plate surface at one side of the first plate 311 and the opposite position of the second plate 312 are protruded outward to form a cam block 313. In a central portion of the second plate 312 is formed a roller slot 316 extending through the direction of the first plate 311. On a side wall of the second plate 312 is formed a bearing hole 315 extending to the roller slot 316. The bearing axle 32 runs through the bearing hole 315 and the roller 33, to place the roller 33 into the roller slot 316. On the side wall of the first plate 311 close to its lower end is formed a swing axle hole 314, so that the swing axle 12 is able to run through both the swing axle installation hole 115 of the fixing slide seat 11, and the swing axle hole 314 of the swing seat 31, to hinge and fix the swing seat 31 between the two first support arms 112 of the fixing slide seat 11.

On a sidewall of the first plate 311 close to one end of the second plate 312 is formed a tool retraction hole 317. The tool retraction axle 341 can be connected to the retraction hole 317 coaxially, as such the tool retraction hook 34 is connected coaxially with the swing seat 31. On the sidewall of the first plate 311 close to its bottom end, and in a direction opposite the cam block 313 is disposed on a protruding stop block 318.

Figure 7:
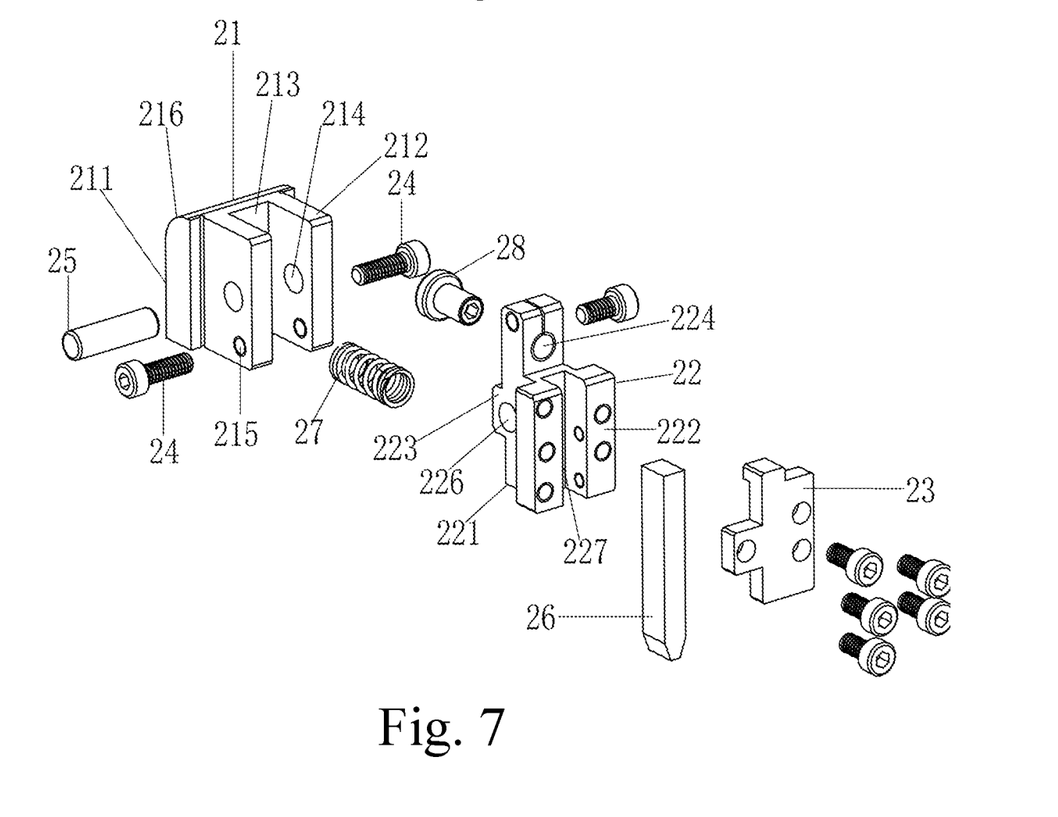
FIG. 7 is an exploded view of a tool component as shown in FIG. 5.
Figure 8:
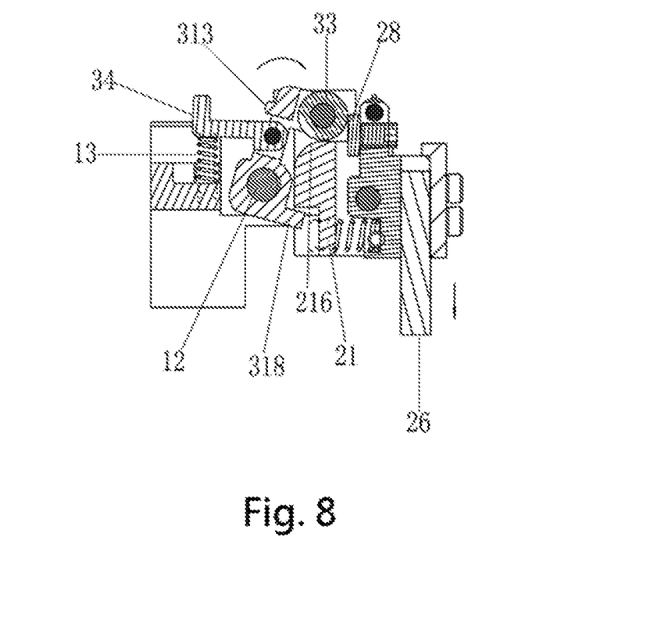
FIG. 8 is a schematic diagram showing a rotary beak seat mechanism in action.

As shown in FIGS. 5 and 7, the tool component 20 includes: a slide block 21, a tool seat 22, a press cover 23, a second lead screw 24, a tool axle 25, a tool 26, a tool retraction spring 27, and a top column 28. The slide block 21 includes a second substrate 211, that can be inserted into the first slide slot 113 of the fixing slide seat 11, and to move reciprocally along the axis of the slide slot 113. On a plate surface in one side of the second substrate 211 is disposed two parallel and opposite second support arms 212 protruding outward. A third slide slot 213 is disposed between the two second support arms 212, to allow movements in up-and-down direction leading to outside. On the plate surface of the respective two support arms 212 is disposed a tool axle hole 214 and the second screw hole 215. The two tool axle holes 214 and the two second screw holes 215 are disposed coaxially leading to the third slide slot 213. The tool axle 25 is able to run through the two tool axle holes 214 at the same time. A second lead screw 24 can be inserted from outside the second support arm 212 into the second screw hole 215. The other end of the slide block spring 50 can be sleeved around the second lead screw 24. On a backside of the second substrate 211 and close to its upper corner is disposed a cam surface 216 of circular arc shape.

The tool seat 22 includes a rectangular shape third substrate 211, disposed in parallel to the second substrate 211 of the slide block 21. On a plate surface of the third substrate 221 opposite to one side of the second substrate 211 is disposed a rotation portion 223 in protrusion. On the opposite plate surface is disposed in symmetry two third support arms 222 of an L shape. Between two third support arms 222 is disposed a tool installation slot 227 for inserting the tool 26. On the plate surface of the third substrate 221 close to its upper end is disposed a top column hole 224. On the plate surface of the third substrate 221 and close to its lower end is disposed a position limiting cavity (not shown) for inserting one end of tool retraction spring 27. The other end of the tool retraction spring 27 can be pressed against the bottom wall for the third slide slot 213 of the slide block 21. On the rotation portion 223 is formed a rotation hole 226 running through two ends of the rotation portion 223. The tool axle 25 runs through the tool axle hole 214 of the slide block 21, and the rotation hole 226 of the tool seat 22 at the same time. The rotation portion 223 of the tool seat 22 can be inserted into the third slide slot 213 of the slide block 21. The press cover 23 is fixed onto an end portion of the third support arm 222, to lock and fix the tool 26 onto the outer wall of the tool installation slot 227.

As shown in FIG. 5, the rotation component 40 includes: an axle core fixing seat 41 disposed along its central axis, the axle core 43, and the press cover 45. The axle core fixing seat 41 is of a cylinder shape, with its front end formed into an arc shape connection block 411. The fixing slide seat 11 can be connected coaxially with the connection block 411. The fixing slide seat 11 can be connected coaxially with the connection block 411, to press tightly against the ring shape side wall of its outer portion. The press cover 45 is of an arc shape, it can be connected and fixed onto the axle core fixing seat 41, and it can be formed into a ring shape with the fixing slide seat 11.

Refer to FIGS. 2, 3, 4, 5, 6, 7, 8, 9 at the same time. As shown in FIGS. 2, 3, 4, 5, 6, 7, 8, 9, in application, the round push rod 210 on the transmission mechanism 200 moves lineally to collide with the cam block 313 on the swing seat 31, to make the swing seat 31 to flip forward around the tool retraction axle hole 317, and to cause the roller 33 to collide with the cam surface 216 on the slide block 21. As such, this action bring the slide block 21 to press downward, to cause the tool 26 to get close to the axle core 43, and when it moves a certain distance to get close the top column 28, it will collide with the top column 28, to bring the tool 26 to clip inside the axle core 43. When the round push rod 210 returns along the reverse direction, it will collide with the end portion of the tool retraction hook 34, to cause the tool retraction hook 34 to move downward. Then, the tool retraction hook 34 pulls the swing seat 31 to flip backward around the tool retraction axle hole 317. At this time, the protruding stop block 318 collides with the bottom outer wall of the slide block 21, to produce an upward force to the slide block 21 to push the slide block 21 upward, as such, bring the tool 26 to move upward to get away from the axle core 43, to realize tool retraction.

Refer to FIGS. 10, 11, 7, 5. As shown in FIGS. 10, 11, 7, 5, the dual-transmission core rotation separation mechanism includes: a first substrate 500, in the center of front plate surface of the first substrate 500 is disposed the rotary beak seat mechanism 100. On the back plate surface of the first substrate 500 is disposed the axle core positioning mechanism 800, the inner circle core rotation transmission mechanism 700, and the outer circle tool rotation transmission mechanism 5. The rotary beak seat mechanism 100 includes the tool rotation disc 525, the core rotation fixing seat 527, the outer circle tool rotation gear 528, and core rotation gear 529 disposed coaxially. The components just mentioned above disposed coaxially with the spring component 30, the axle core 43, and the axle core fixing seat 41. When the core rotation gear 529 rotates, it brings the axle core fixing seat 41 to rotate at the same time. The outer circle tool rotation gear 528 is able to bring the tool rotation disc 525 into rotation. the core rotation fixing seat 527 is connected and fixed to the first substrate 500.

Figure 10:
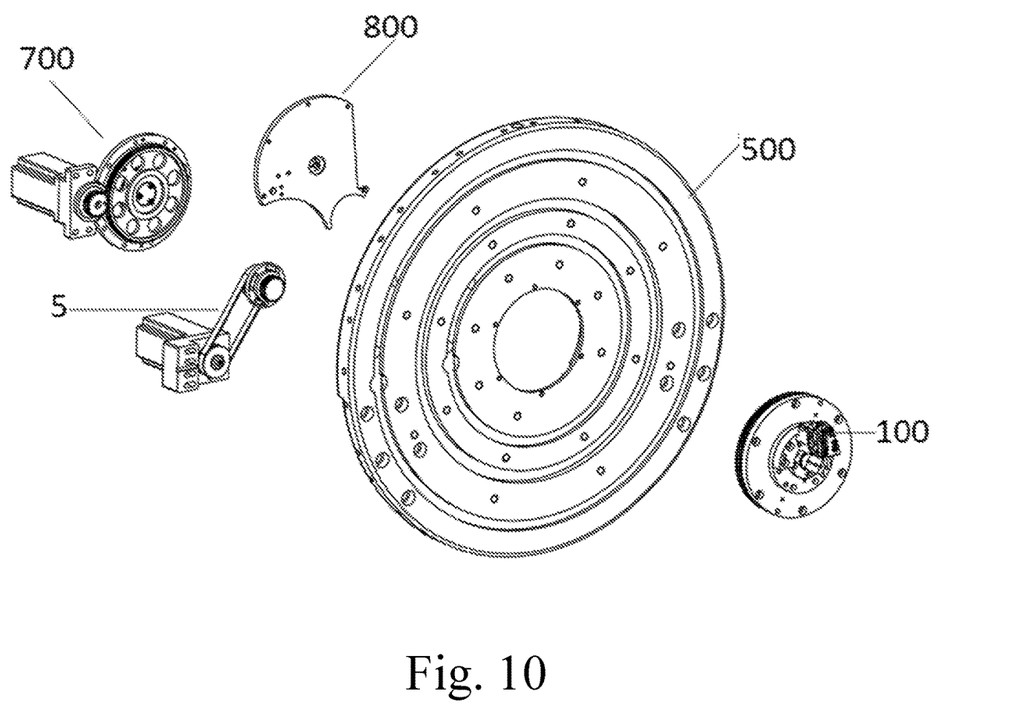
FIG. 10 is an exploded view of a dual-transmission core rotation separation mechanism.
Figure 11:
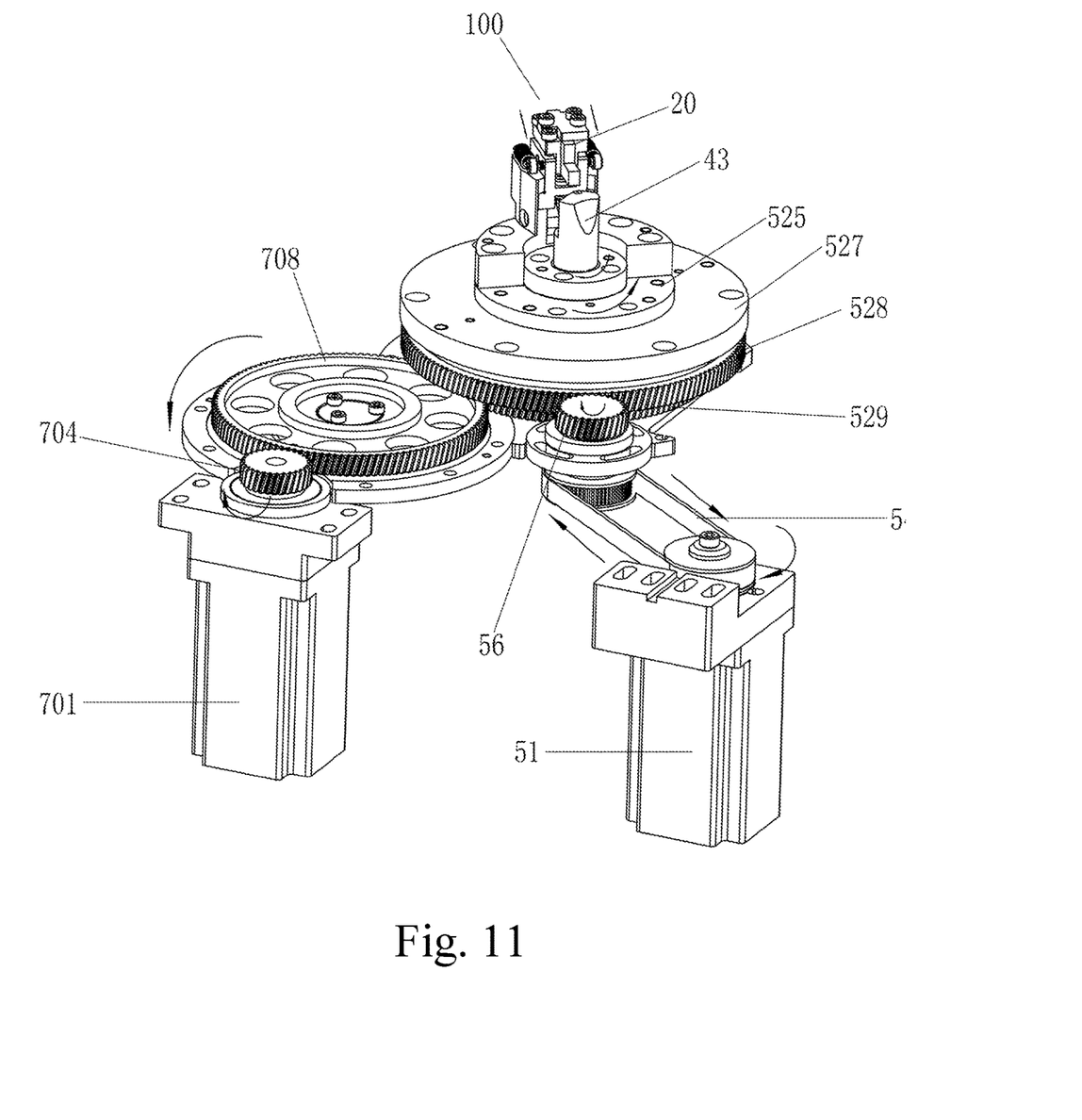
FIG. 11 is a perspective view of a dual-transmission core rotation separation mechanism as viewed from a backside of a panel board.
Figure 12:
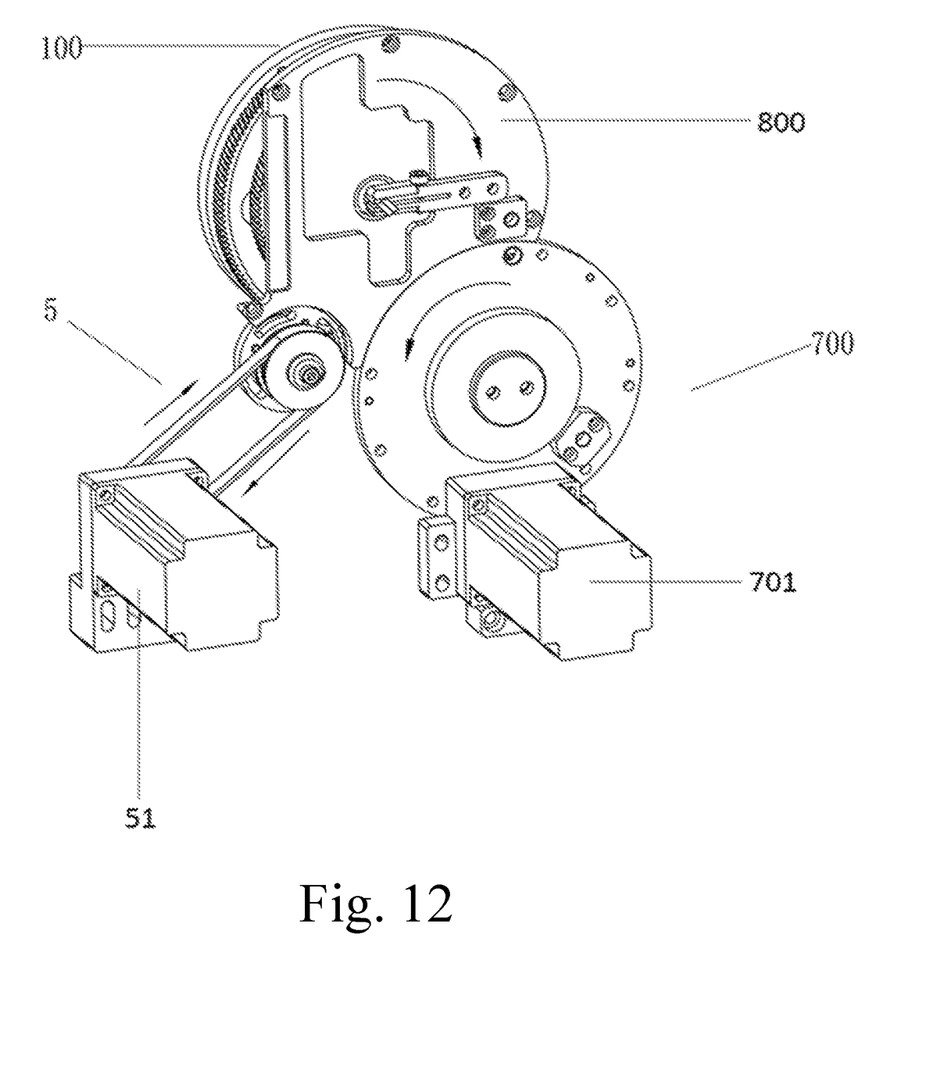
FIG. 12 is a perspective view of a dual-transmission core rotation separation mechanism as viewed from another angle in a backside of a panel board.
Figure 13:
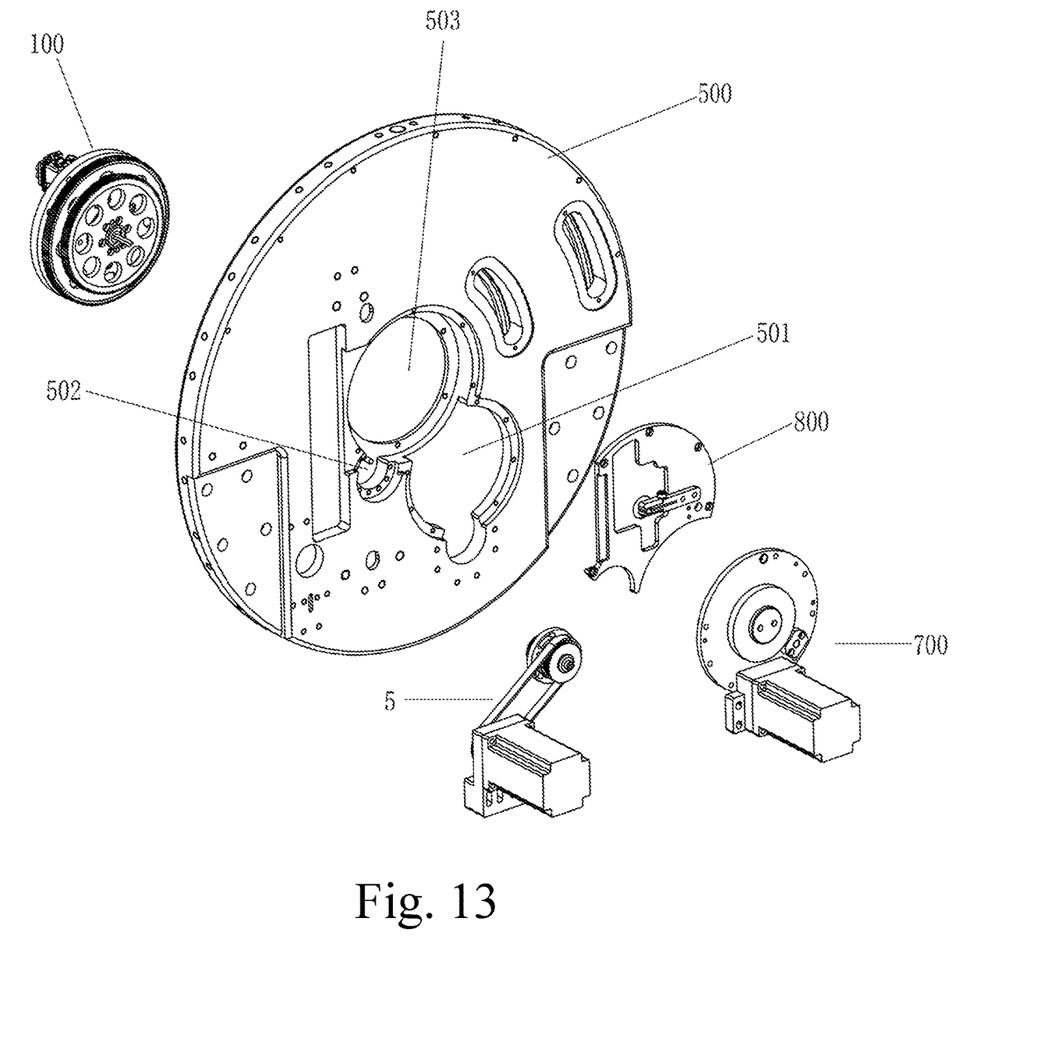
FIG. 13 is an exploded view of a dual-transmission core rotation separation mechanism as viewed from another angle.

As shown in FIGS. 10 and 11, the inner circle core rotation transmission mechanism 700 includes the first servomotor 701 and the core rotation bridge gear 708. The first servomotor 701 drives the core rotation transmission gear 704 into rotation. The core rotation transmission gear 704 is engaged with the core rotation bridge gear 708, and it brings the core rotation bridge gear 708 into rotation. The core rotation bridge gear 708 is engaged with the core rotation gear 529 of the rotary beak seat mechanism 100, and it brings the core rotation gear 529 into rotation. The rotations of the core rotation gear 529 in turn bring the core rotation fixing seat 527 into rotation at the same time.

Refer again FIGS. 10 and 11, the outer circle tool rotation transmission mechanism 5 includes: a second servomotor 51, a leather belt 54, and an outer circle tool rotation transmission gear 56. Through the transmission of the leather belt 54, the second servomotor 51, brings the outer circle tool rotation transmission gear 56 into rotation. The outer circle tool rotation transmission gear 56 engages with the outer circle tool rotation gear 528 of the rotary beak seat mechanism 100, to bring the outer circle tool rotation gear 528 and tool rotation disc 525 into rotation at the same time. The leather belt 54 may realize the effect of engagement and rotation through using a gear (not shown).

As shown in FIGS. 10 to 13, the core rotation positioning mechanism 800, the inner circle core rotation transmission mechanism 700, and outer circle tool rotation transmission mechanism 5 can be connected and fixed to the first substrate 500. On the first substrate 500 is formed a first installation hole 501, a second installation hole 502, and a third installation hole 503. The third installation hole 503 is formed in a central part of the first substrate 500, and the first installation hole 501 and the second installation hole 502 are formed close to the third installation hole 503.

The core rotation fixing seat 527 of the rotary beak seat mechanism 100 can be inserted into the third installation hole 503, and is mounted on the front plate surface of the first substrate 500, such that the rotary beak seat mechanism 100 is connected and fixed onto the first substrate 500. The core rotation positioning mechanism 800 can be inserted into the third installation hole 503, and is mounted on the back plate surface of the first substrate 500, such that the core rotation positioning mechanism 800 is connected and fixed onto the first substrate 500. The inner circle core rotation transmission mechanism 700 can be inserted into the first installation hole 501, and is mounted on the back plate surface of the first substrate 500, such that the inner circle core rotation transmission mechanism 700 is connected and fixed onto the first substrate 500. The outer circle tool rotation transmission mechanism 5 can be inserted into the second installation hole 502, and is mounted on the back plate surface of the first substrate 500, such that the outer circle tool rotation transmission mechanism 5 is connected and fixed onto the first substrate 500.

Summing up the above, in the present invention, the rotary beak seat mechanism 100 makes use of the inner circle core rotation transmission mechanism 700 and the outer circle tool rotation transmission mechanism 5 mounted separately on its back. Through control of the first servomotor 701 and the second servomotor 51, the two discs on the rotary beak seat mechanism 100 is made to rotate respectively 360 degrees. As such, the core rotation bridge gear 708 on the inner circle core rotation transmission mechanism 700 brings the core rotation gear 529 of the rotary beak seat mechanism 100 into rotation. Also, the outer circle tool rotation transmission gear 56 of the outer circle tool rotation transmission mechanism 5 brings the outer circle tool rotation gear 528 of the rotary beak seat mechanism 100 into rotation, such that the inner circle core rotation transmission mechanism 700 brings the axle core 43 into rotation. Therefore, the advantages of the present invention are: increased processing flexibility without having any blind angle, without the need of secondary processing or rework, to produce the springs of desired gauge, in achieving saving of repeated processings significantly. Further, the outer circle tool rotation transmission mechanism 5 is added a tool component 20 and auxiliary elements to achieve special effects, to improve effectively the various shortcomings of the Prior Art as caused by the conventional tool rotate synchronously with the axle core (unitary transmission).

Figure 9:
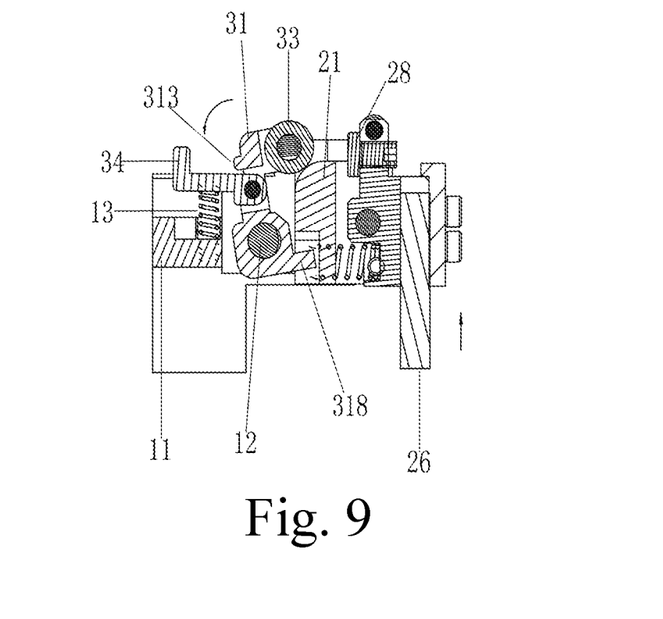
FIG. 9 is a schematic diagram showing a rotary beak seat mechanism of FIG. 8 in another action.

Moreover, the present invention utilizes the swing component 30 and the tool component 20 on the slide seat component 10 of the rotary beak seat mechanism 100, to make the tool retraction hook to perform lever-like turning and flipping movements. Therefore, when the tool retraction hook 34 swings downward, the swing component 30 is brought to turn and flip upward, to bring the tool component 20 to move upward to realize tool retraction (as shown in FIG. 9), in achieving a fast and smooth tool retraction. In contrast, when the tool retraction hook 34 swings upward, the swing component 30 is brought to turn and flip downward, to bring the tool component 20 to move downward to realize inward clipping of the tool 26. Therefore, the present invention solves the problem of the Prior Art that, tool 26 can not be pulled back or tool retraction can not be done smoothly.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A spring forming machine having tool rotation and tool retraction capabilities, comprising:
   a rotary beak seat mechanism, installed on a transmission mechanism of an outside machine panel board through a panel board bearing, wherein the rotary beak seat mechanism includes a rotation component, that rotates 360 degrees around a central axis of the panel board bearing, on a front end of the rotation component is disposed a slide seat component coaxially, on the slide seat component is disposed rotatably a swing component and a tool component coaxially, on the swing component is disposed a tool retraction hook, to make leverage turning and flipping movements, the rotation mechanism is provided with a round push rod, to clamp around outside the tool retraction hook, and through push-pull movements of the round push rod, the tool component is brought to move reciprocally along a vertical direction of the slide seat component, to realize tool retraction; and
   a dual-transmission core rotation separation mechanism, that includes: a first substrate, wherein in a center of a front plate surface of the first substrate is disposed the rotary beak seat mechanism, on a back plate surface of the first substrate is disposed an axle core positioning mechanism, an inner circle core rotation transmission mechanism, and an outer circle tool rotation transmission mechanism, through controlling the inner circle core rotation transmission mechanism and the outer circle tool rotation transmission mechanism to move independently, the rotation component on the rotary beak seat mechanism is rotatable in 360 degrees.

2. The spring forming machine having tool rotation and tool retraction capabilities as claimed in claim 1, wherein the tool component is connected to the slide seat component through a slide block spring, the slide seat component includes a fixing slide seat, the fixing slide seat includes a semi-circular bottom plate, on the semi-circular bottom plate is formed two first support arms opposite and parallel to each other, and the tool component is disposed between the two first support arms.

3. The spring forming machine having tool rotation and tool retraction capabilities as claimed in claim 1, wherein the swing component includes: an L-shape swing seat, and a first plate and a second plate disposed vertical to each other and connected into a body, wherein the first plate is inserted into a slide slot of the fixing slide seat, on a plate surface at one side of the first plate and on an opposite position of the second plate are protruded outward to form a cam block, on the second plate is disposed a roller, on a side wall of the first plate close to one end of the second plate is formed a tool retraction axle hole, so that the tool retraction hook is rotatably connected to the swing seat, on an outer sidewall close to a bottom end of the first plate is disposed on a protruding stop block.

4. The spring forming machine having tool rotation and tool retraction capabilities as claimed in claim 2, wherein the tool component further includes: a top column, a tool retraction spring, and a slide block, the slide block is inserted into a slide slot of the fixing slide seat, to move reciprocally along the slide slot, on an upper corner of the slide block is disposed a cam surface of circular arc shape, the tool retraction spring is pressed against on a bottom wall for the slide slot of the slide block.

5. The spring forming machine having tool rotation and tool retraction capabilities as claimed in claim 2, wherein the rotation component includes: an axle core fixing seat disposed along its central axis line, an axle core, and a press cover, a front end of the axle core fixing seat is formed into a connection block connected coaxially with the fixing slide seat.

6. The spring forming machine having tool rotation and tool retraction capabilities as claimed in claim 1, wherein the rotary beak seat mechanism further includes a tool rotation disc, a core rotation fixing seat, an outer circle tool rotation gear, and a core rotation gear disposed coaxially, when the core rotation gear rotates, it brings the axle core fixing seat into rotation at the same time, the outer circle tool rotation gear brings the tool rotation disc into rotation, and the core rotation fixing seat is connected and fixed on the first substrate.

7. The spring forming machine having tool rotation and tool retraction capabilities as claimed in claim 6, wherein the inner circle core rotation transmission mechanism includes, a first servomotor, a core rotation transmission gear, and a core rotation bridge gear, the first servomotor drives the core rotation transmission gear into rotation, the core rotation transmission gear brings the core rotation bridge gear into rotation, the core rotation bridge gear brings the core rotation gear of the rotary beak seat mechanism into rotation, the rotations of the core rotation gear in turn brings the core rotation fixing seat into rotation at the same time.

8. The spring forming machine having tool rotation and tool retraction capabilities as claimed in claim 6, wherein the outer circle tool rotation transmission mechanism includes:
a second servomotor, an outer circle tool rotation transmission gear, the second servomotor brings the outer circle tool rotation transmission gear into rotation, the outer circle tool rotation transmission gear engages the outer circle tool rotation gear of the rotary beak seat mechanism, to bring the outer circle tool rotation gear and tool rotation disc into rotation at the same time.

\* \* \* \* \*